(12) United States Patent
Lan et al.

(10) Patent No.: US 6,251,980 B1
(45) Date of Patent: Jun. 26, 2001

(54) NANOCOMPOSITES FORMED BY ONIUM ION-INTERCALATED CLAY AND RIGID ANHYDRIDE-CURED EPOXY RESINS

(75) Inventors: Tie Lan, Lake Zurich; Erin K. Westphal, Oakwood Hills, both of IL (US)

(73) Assignee: AMCOL International Corporation, Arlington Heights, IL (US)

( * ) Notice: Subject to any disclaimer, the term of this patent is extended or adjusted under 35 U.S.C. 154(b) by 0 days.

(21) Appl. No.: 09/272,277

(22) Filed: Mar. 19, 1999

Related U.S. Application Data

(63) Continuation-in-part of application No. 08/907,950, filed on Aug. 11, 1997, which is a continuation-in-part of application No. 08/758,740, filed on Dec. 6, 1996.

(51) Int. Cl.$^7$ .................................................. C08K 3/00
(52) U.S. Cl. ...................... 524/445; 524/442; 524/443; 524/447; 524/449; 524/450
(58) Field of Search ..................... 524/442, 443, 524/444, 445, 447, 449, 450

(56) References Cited

U.S. PATENT DOCUMENTS

| | | | |
|---|---|---|---|
| 2,035,546 | 3/1936 | Hamilton | 167/24 |
| 3,419,460 | 12/1968 | Ure | 161/162 |

(List continued on next page.)

FOREIGN PATENT DOCUMENTS

| | | |
|---|---|---|
| DT 1 642 122 | 7/1970 | (DE) . |
| 281 585 A5 | 8/1990 | (DE) . |
| 0 205 281 A3 | 12/1986 | (EP) . |
| 0 335 653 A1 | 10/1989 | (EP) . |
| 0 358 415 A1 | 3/1990 | (EP) . |
| 0 479 031 A1 | 4/1992 | (EP) . |
| 0 548 940 A1 | 6/1993 | (EP) . |
| 0 645 181 A2 | 6/1993 | (EP) . |
| 0 747 451 A2 | 12/1996 | (EP) . |
| 0 761 739 A1 | 3/1997 | (EP) . |
| 0 619 182 A1 | 6/1997 | (EP) . |
| 0 780 340 A1 | 6/1997 | (EP) . |
| 1 146 668 | 3/1969 | (GB) . |
| 1 565 362 | 4/1980 | (GB) . |
| 2 088 932 | 6/1982 | (GB) . |
| WO 93/04117 | 3/1993 | (WO) . |
| WO 93/04118 | 3/1993 | (WO) . |
| WO 93/11190 | 6/1993 | (WO) . |
| WO 96/08526 | 3/1996 | (WO) . |
| WO 98/01346 | 1/1998 | (WO) . |

OTHER PUBLICATIONS

C. W. Francis, "Adsorption of Polyvinylpyrrolidone on Reference Clay Minerals", Soil Science, vol. 115, No. 1, 1973, pp. 40–54.
A. Usuki, et al., "Synthesis of nylon 6–clay hybrid", J. Mater. Res., vol. 8, No. 5, May 1993, pp. 1179–1184.
Y. Kojima, et al., "Mechanical Properties Of Nylon 6–Clay Hybrid", J. Mater. Res., vol. 8, No. 5, May 1993, pp. 1185–1189.
K. Suzuki, et al., "Preparation Of Delaminated Clay Having A Narrow Micropore Distribution In The Presence Of Hydroxyaluminum Cations And Polyvinyl Alcohol", Clays and Clay Minerals, vol. 36, No. 2, 1988, pp. 147–152.
D.J. Greenland, "Adsorption Of Polyvinyl Alcohols By Montmorillonite", Journal of Colloid Science, 18, (1963) pp. 647–664.
R. Levy, et al., "Interlayer Adsorption of Polyvinylpyrrolidone On Montmorillonite", Journal of Colloid and Interface Science, vol. 50, No. 3, Mar. 1975, pp. 442–450.
R.A. Vaia, et al., "Synthesis and Properties of Two–Dimensional Nanostructures by Direct Intercalation of Polymer Melts in Layered Silicates", Chem. Mater. 1993, 5, pp. 1694–1969.
R.A. Vaia, et al., "New Polymer Electrolyte Nanocomposites: Melt Intercalation of Poly(ethylene oxide) in Mica–Type Silicates", Advanced Materials 1995, 7, No. 2, pp. 154–156.
A. Akelah, et al., "Synthesis and Characterization of Epoxyphilic montmorillonites", Clay Minerals (1994) 29, pp. 169–178.
C.E. Clapp, et al., "Adsorption Studies Of A Dextran On Montmorillonite", Trans. 9th Int. Cong. Soil Sci., 1968, vol. 1, pp. 627–634.
H.G.G. Dekking, "Preparation And Properties Of Some Polymer–Clay Compounds", Clays and Clay Minerals, 1964, 12, pp. 603–616.
A. Usuki, et al., "Characterization and Properties of Nylon 6—Clay Hybrid", (source and date unknown), pp. 651–652.
G.W. Brindley, et al., "Preparation And Solvatio Properties Of Some Variable Charge Montmorillonites", Clays and Clay Minerals, 1971, vol. 18, pp. 399–404.
A. Okada, et al., "A Solid State NMR Study On Crystalline Forms Of Nylon 6", Journal of Applied Polymer Science, (1989), vol. 37, pp. 1363–1371.
A. Usuki, et al., Swelling Behavior Of Montmorillonite Cation Exchanged For ω–Amino Acids By ε–Caprolactam, J. Mater. Res., vol. 8, No. 5, May 1993, pp. 1174–1178.

(List continued on next page.)

Primary Examiner—Edward J. Cain
(74) Attorney, Agent, or Firm—Marshall, O'Toole, Gerstein, Murray & Borun

(57) ABSTRACT

Intercalates formed by contacting a layered material, e.g., a phyllosilicate, with an intercalant onium ion spacing agent and an anhydride-curable epoxy resin. The intercalant onium ion spacing agent converts the interlayer region of the layered materials from hydrophilic to hydrophobic, therefore, the anhydride-curable epoxy resin can be easily intercalated into the interlayer spacing. The co-presence of the co-intercalant anhydride-curable epoxy resin in the interlayer space provides surprising increase in glass transition temperature for anhydride-curable epoxy resin matrix polymer/co-intercalant compounded nanocomposites. The nanocomposites (e.g., epoxy-clay) prepared from the intercalants demonstrate enhanced mechanical, thermal and chemical resistance compared with pristine polymer matrices.

46 Claims, 2 Drawing Sheets

U.S. PATENT DOCUMENTS

| | | | |
|---|---|---|---|
| 3,419,517 | 12/1968 | Hedrick et al. | 260/37 |
| 3,515,626 | 6/1970 | Duffield | 161/162 |
| 3,773,708 | 11/1973 | Takahashi et al. | 260/41 R |
| 3,795,650 | 3/1974 | Burns | 260/33.4 R |
| 3,912,532 | 10/1975 | Simone | 106/308 N |
| 3,929,678 | 12/1975 | Laughlin et al. | 252/526 |
| 3,929,849 | 12/1975 | Oswald | 260/448 |
| 4,053,493 | 10/1977 | Oswald | 260/448 |
| 4,125,411 | 11/1978 | Lyons | 106/291 |
| 4,136,103 | 1/1979 | Oswald | 260/448 |
| 4,164,487 | 8/1979 | Martin | 260/29.2 EP |
| 4,210,572 | 7/1980 | Herman et al. | 260/40 |
| 4,251,576 | 2/1981 | Osborn et al. | 428/331 |
| 4,400,485 | 8/1983 | Mukamal et al. | 524/444 |
| 4,431,755 | 2/1984 | Weber et al. | 523/203 |
| 4,434,075 | 2/1984 | Mardis et al. | 252/315.2 |
| 4,472,538 | 9/1984 | Kamigaito et al. | 523/202 |
| 4,500,670 | 2/1985 | McKinley et al. | 524/445 |
| 4,546,145 | 10/1985 | Kishida et al. | 524/780 |
| 4,600,744 | 7/1986 | Libor et al. | 524/446 |
| 4,613,542 | 9/1986 | Alexander | 428/290 |
| 4,624,982 | 11/1986 | Alexander | 524/446 |
| 4,739,007 | 4/1988 | Okada et al. | 524/789 |
| 4,789,403 | 12/1988 | Rice | 106/417 |
| 4,798,766 | 1/1989 | Rice | 428/404 |
| 4,810,734 | 3/1989 | Kawasumi et al. | 523/216 |
| 4,842,651 | 6/1989 | Ravet et al. | 106/487 |
| 4,849,006 | 7/1989 | Knudson, Jr. | 71/64.11 |
| 4,851,021 | 7/1989 | Bohrn et al. | 65/17 |
| 4,875,762 | 10/1989 | Kato et al. | 350/357 |
| 4,889,885 | 12/1989 | Usuki et al. | 524/443 |
| 4,894,411 | 1/1990 | Okada et al. | 524/710 |
| 4,920,171 | 4/1990 | Hutton, Jr. et al. | 524/446 |
| 4,956,121 | 9/1990 | Tymon et al. | 252/378 R |
| 5,028,351 | 7/1991 | Kato et al. | 252/315.2 |
| 5,032,546 | 7/1991 | Giannelis et al. | 501/3 |
| 5,032,547 | 7/1991 | Gainnelis et al. | 501/3 |
| 5,091,462 | 2/1992 | Fukui et al. | 524/504 |
| 5,102,948 | 4/1992 | Deguchi et al. | 524/789 |
| 5,164,440 | 11/1992 | Deguchi et al. | 524/444 |
| 5,164,460 | 11/1992 | Yano et al. | 624/445 |
| 5,204,078 | 4/1993 | Tateyama et al. | 423/331 |
| 5,206,284 | 4/1993 | Fukui et al. | 524/504 |
| 5,229,451 | 7/1993 | Carter et al. | 524/493 |
| 5,248,720 | 9/1993 | Deguchi et al. | 524/444 |
| 5,326,500 | 7/1994 | Friedman et al. | 252/378 |
| 5,340,558 | 8/1994 | Friedman et al. | 423/328.1 |
| 5,385,776 | 1/1995 | Maxfield et al. | 428/297 |
| 5,391,437 | 2/1995 | Miyasaka et al. | 528/425.5 |
| 5,414,042 | 5/1995 | Yasue et al. | 524/789 |
| 5,428,094 | 6/1995 | Tokoh et al. | 524/379 |
| 5,506,046 | 4/1996 | Andersen et al. | 524/446 |
| 5,508,072 | 4/1996 | Andersen et al. | 524/446 |
| 5,514,734 | 5/1996 | Maxfield et al. | 523/204 |
| 5,552,469 | 9/1996 | Beall et al. | 524/445 |
| 5,554,670 | 9/1996 | Giannelis et al. | 523/209 |
| 5,578,672 | 11/1996 | Beall et al. | 624/446 |
| 5,659,034 | 8/1997 | DeBord et al. | 546/2 |
| 5,667,886 | 9/1997 | Gough et al. | 428/331 |
| 5,698,624 | 12/1997 | Beall et al. | 524/445 |
| 5,721,306 | 2/1998 | Tsipursky et al. | 524/449 |
| 5,730,996 | 3/1998 | Beall et al. | 424/405 |
| 5,747,403 | 5/1998 | Boyd et al. | 502/62 |
| 5,747,560 | 5/1998 | Christiani et al. | 523/209 |
| 5,760,106 | 6/1998 | Pinnavaia et al. | 523/209 |
| 5,760,121 | 6/1998 | Beall et al. | 524/450 |
| 5,766,751 | 6/1998 | Kotani et al. | 428/323 |
| 5,801,216 | 9/1998 | Pinnavaia et al. | 523/209 |
| 5,804,613 | 9/1998 | Beall et al. | 523/200 |
| 5,830,528 | 11/1998 | Beall et al. | 427/220 |
| 5,837,763 | 11/1998 | Ferraro et al. | 524/449 |
| 5,844,032 | 12/1998 | Serrano et al. | 524/445 |
| 5,849,830 | 12/1998 | Tsipursky et al. | 524/450 |
| 5,853,886 | 12/1998 | Pinnavaia et al. | 428/403 |
| 5,877,248 | 3/1999 | Beall et al. | 524/450 |
| 5,880,197 | 3/1999 | Beall et al. | 524/445 |
| 5,910,523 | 6/1999 | Hudson | 523/213 |
| 5,981,029 | 11/1999 | Harada et al. | 428/143 |
| 5,994,445 | 11/1999 | Kaschel et al. | 524/444 |
| 6,071,988 | 6/2000 | Barbee et al. | 523/210 |
| 6,084,019 | 7/2000 | Matayabas, Jr. et al. | 524/445 |

OTHER PUBLICATIONS

Y. Kojima, et al., "One–Pot Synthesis Of Nylon 6–Clay Hybrid", Journal of Polymer Science: Part A: Polymer Chemistry, vol. 31, (1993), pp. 1755–1758.

Y. Kojima, et al., "Fine Structure Of Nylon–6–Clay Hybrid", Journal of Polymer Science: Part B: Polymer Physics, vol. 32 (1994), pp. 625–630.

B.K.G. Theng, "Clay–Polymer interactions: Sumary And Perspectives", Clays and Clay Minerals, vol. 30, No. 1 (1982) pp. 1–9.

Sugahara, et al., "Clay–Organic Nano–Composite; Preparation of a Kaolinite–Poly(vinylpyrrolidone) Intercalation Compound", *Journal of the Ceramic Society of Japan*, International Edition, vol. 100, No. 4, Apr. 1, 1992, pp. 420–423.

Ogawa, et al., "Preparation Of Montmorillonite–Polyacrylamide Intercalation Compounds And The Water Absorbing Property", *Clay Science*, vol. 7, 1989 Tokyo, Japan, pp. 243–251.

Wu, et al., "Structural, thermal, and electrical characterization of layered nanocomposites derived from sodium–montmorillonite and polyethers", Chemical Abstracts, vol. 119, No. 4, Jul. 26, 1993 Columbus, Ohio, US, Abstract No. 31017r.

Bujdak, et al., "The reaction of montmorillonite with octadecylamine in solid and melted state", Chemical Abstracts, vol. 118, No. 26, Abstract No. 257609b, p. 166 (Jun. 28, 1993), Columbus, Ohio (US).

Sanchez Camazano, M. et al., "Factors influencing interactions of organophosphorus pesticides with montmorillonite", Chemical Abstracts, vol. 98, No. 19, May 9, 1983, Columbus, Ohio, US, Abstract No. 156367.

T. Lan, et al., "Clay–Epoxy Nanocomposites: Relationships Between Reinforcement Properties And The Extent Of Clay Layer Exfoliation", *Polym. Mater. Sc. Eng.*, 73, pp. 296–297 (1995).

Yano, et al., "Synthesis And Properties Of Polyimide–Clay Hybrid", Polymer Preprints, ACS, Apr. 1991, pp. 65–66.

Giannelis, et al., "Synthesis And Processing Of Ceramics: Scientific Issues", Materials Research Society Symposium Proceedings, vol. 249 (1992), pp. 547–558.

Fisch, et al., "Über den Härtungsmechanismus der Äthoxylinharze", Journal of Polymer Science, vol. XII, pp. 497–502 (1954).

Fischer, R.F., "Polyesters from Epoxides and Anhydrides", Journal of Polymer Science, vol. XLIV, pp. 155–172 (1960).

Matějka, et al., "Curing Epoxy Resins with Anhydrides. Model Reactions and Reaction Mechanism*", Journal of Polymer Science: Polymer Chemistry Edition, vol. 21, pp. 2873–2885 (1983).

Fisch, et al., "The Curing Mechanism of Epoxy Resins*", J. appl. Chem., Oct. 6, 1956, pp. 429–441.

Stevens, G.C., "Cure Kinetics of a Low Epoxide/Hydroxyl Group–Ratio Bisphenol A Epoxy Resin–Anhydride System by Infrared Absorption Spectroscopy", Journal of Applied Polymer Science, vol. 26, 4259–4278 (1981).

NANOCOMPOSITES FORMED BY ONIUM ION-INTERCALATED CLAY AND RIGID ANHYDRIDE-CURED EPOXY RESINS

CROSS REFERENCE TO RELATED APPLICATION

This application is a continuation-in-part of U.S. application Ser. No. 08/907,950 filed Aug. 11, 1997, which is a continuation-in-part of U.S. application Ser. No. 08/758,740 filed Dec. 6, 1996.

FIELD OF THE INVENTION

The present invention is directed to epoxy nanocomposite compositions containing onium ion and epoxy resin co-intercalated layered materials and exfoliates thereof, in rigid anhydride-cured epoxy resin matrix polymers. A swellable layered material, such as a phyllosilicate, e.g., a smectite clay, is first intercalated with an onium ion spacing agent, as well known in the art, to expand the interlaminar spacing between adjacent layers of the layered material at least about 3 Å, preferably at least about 5 Å, to at least about 10 Å, preferably to at least about 15 Å. The ion-exchange of the layered material inorganic cations with the onium ion (ammonium, phosphonium, oxonium or sulfonium ion) spacing agent molecules enables the conversion of the hydrophilic interior clay platelet surfaces to hydrophobic platelet surfaces, so that an anhydride-curable epoxy resin then can be intercalated between the onium ion-expanded planar platelets so that the co-intercalated phyllosilicate can be easily exfoliated in the anhydride-cured epoxy matrix polymer to form an anhydride-cured epoxy nanocomposite composition. The intercalated epoxy is not chemically or ionically bound to the platelet surfaces, but intercalates into the onium ion-intercalated interlayer spaces due to the compatibility with the onium ion-intercalated platelet surfaces. The preferred minimum molar ratio of the onium ion intercalant to the interlayer inorganic cations to convert the platelet surfaces from hydrophilic to hydrophobic is at least about 0.5:1, more preferably at least about 1:1. However, the molar ratio of the onium ion molecules to the interlayer exchangeable cations, in the interlayer spaces between phyllosilicate platelets, can be reduced to a substantially lower level, e.g., in the range of from about 0.2:1 to about 0.5:1 while achieving sufficient spacing between adjacent phyllosilicate platelets for intercalation of the anhydride-curable epoxy resin and subsequent platelet exfoliation. The compositions are useful for sealing electronic components; adhesives; potting or encapsulation; electronic insulation; filament winding resin binders, and the like, and have increased glass transition temperatures.

BACKGROUND OF THE INVENTION AND PRIOR ART

It is well known that phyllosilicates, such as smectite clays, e.g., sodium montmorillonite and calcium montmorillonite, can be treated with organic molecules, such as organic ammonium ions, to intercalate the organic molecules between adjacent, planar silicate layers, for bonding the organic molecules with a polymer, such as an epoxy resin, for intercalation of the polymer between the layers, thereby substantially increasing the interlayer (interlaminar) spacing between the adjacent silicate layers. The thus-treated, intercalated phyllosilicates, having interlayer spacings of at least about 10–20 Å and up to about 300 Å, then can be exfoliated, e.g., the silicate layers are separated, e.g., mechanically, by high shear mixing. The individual silicate layers, when admixed with a matrix polymer, e.g., an epoxy—see U.S. Pat. Nos. 4,889,885; 5,554,670; 5,760,106 and 5,801,216 —have been found to improve one or more properties of the polymer, such as mechanical strength and/or high temperature characteristics.

Exemplary prior art composites, also called "nanocomposites", are disclosed in published PCT disclosure of Allied Signal, Inc. WO 93104118 and U.S. Pat. No. 5,385,776, disclosing the admixture of individual platelet particles, derived from intercalation of layered silicate materials, with a polymer to form a nanocomposite having one or more properties of the matrix polymer improved by the addition of the exfoliated intercalate. As disclosed in WO 93/04118 and U.S. Pat. No. 5,554,670, the intercalate is formed (the interlayer spacing between adjacent silicate platelets is increased) by adsorption of a silane coupling agent or an onium cation, such as a quaternary ammonium compound, having a reactive group which is compatible with the matrix polymer. Such quaternary ammonium cations are well known to convert a highly hydrophilic clay, such as sodium montmorillonite or calcium montmorillonite, into an organophilic clay capable of sorbing organic molecules.

In accordance with the present invention, intercalates are prepared by contacting a phyllosilicate with an onium ion that does not contain an epoxy-reactive functional moiety so that a subsequently intercalated anhydride-cured epoxy does not bond to the intercalated onium ion molecule.

In accordance with an important feature of the present invention, best results are achieved by mixing the layered material with the onium ion molecules in a molar ratio of at least about 0.5:1 onium ions to layered material interlayer exchangeable cations, preferably at least about a 1:1 molar ratio of onium ions to exchangeable platelet cations. Regardless of the concentration of onium ion spacing/coupling agent, the intercalating composition should have an onium ion layered material weight ratio of at least 1:20, preferably at least 1:10, more preferably at least 1:5, and most preferably at least about 1:4 to achieve sufficient ion-exchange of the protonated atom of the onium ion molecule ($N^+$, $P^+$, $O^+$ or $S^+$) with inner surface cations of the platelets of the layered material to achieve efficient intercalation and bonding of the onium ion compound at the platelet surfaces for subsequent exfoliation, particularly after epoxy resin intercalation. The onium ion intercalant compound sorbed between and bonded to (ion-exchanged with) the silicate platelets causes sufficient separation or added spacing between adjacent silicate platelets for easy co-intercalation of the anhydride-curable epoxy resin. It should be understood that when determining the molar ratio of onium ions to layered material, it is the moles of onium ion (without the dissociated anion) that is calculated, without considering the molecular weight of the dissociated anion once the onium ion compound is solubilized.

One prior art method of preparing layered silicate-epoxy nanocomposites is disclosed by Giannelis in U.S. Pat. No. 5,554,670. In accordance with the method disclosed in the Giannelis '670 patent, a smectite-type clay is first contacted with an organic compound containing alkylammonium ions having functional groups which are reactive to epoxy resin molecules. The clay layers are attached to the polymer network via onium ion-exchange with the clay platelet cations—the epoxy resin reacting with the reactive functionality on the onium ion molecule. The nanocomposites disclosed in the '670 patent exhibit a slightly increased glass transition temperature—the dynamic storage modulus of the nanocomposite was considerably higher in the glassy region and very much higher in the rubbery region when compared with the pristine matrix polymer.

It has now been found that the glass transition temperature (Tg) of rigid anhydride-cured epoxy resins (rigid being defined herein as having a Tg>30° C.) can be unexpectedly raised by mixing the anhydride-curable epoxy resin with a nanomer formed by intercalating a layered silicate material, such as a phyilosilicate, with organic onium ions to space the adjacent platelets sufficiently for intercalation of an anhydride-curable epoxy resin, and mixing the onium ion-intercalated layered material with an anhydride-curable epoxy resin and an anhydride curing agent to co-intercalate the anhydride-curable epoxy resin with onium ions and the anhydride curing agent to form the nanocomposite composition.

In principle, the anhydride-curable epoxy resin and onium ion co-intercalants of the present invention perform together in the gallery of the layered materials to make the inorganic layered materials compatible with the epoxy matrix polymer and form the nanocomposite. The anhydride-cured epoxy resin does not bond to the onium ions or to the phyllosilicate platelets since the onium ions are not epoxy-reactive functionalized. The co-intercalates made by the process of the present invention can be admixed with all market available epoxy resin systems to form nanocomposites. Examples of suitable epoxy resins include: Bisphenol A-derived resins, Epoxy cresol Novolac resins, Epoxy phenol Novolac resins, and the like.

DEFINITIONS

Whenever used in this Specification, the terms set forth shall have the following meanings:

"Layered Material" shall mean an inorganic material, such as a smectite clay mineral, that is in the form of a plurality of adjacent, bound layers and has a thickness, for each layer, of about 3 Å to about 50 Å, preferably about 10 Å.

"Platelets" shall mean individual layers of the Layered Material.

"Intercalate" or "Intercalated" shall mean a Layered Material that includes organic onium ion molecules disposed between and bound to adjacent platelets of the Layered Material that are ion-exchanged for layered material exchangeable cations to increase the interlayer spacing between the adjacent platelets at least 3 Å, preferably at least 5 Å to an interlayer spacing of, for example, at least about 10 Å, preferably to at least about 15 Å, and the layered material also includes epoxy molecules disposed between adjacent layered material platelets until the platelets have a d-spacing of at least about 20 Å, preferably about 20–35 Å. The epoxy is bound neither to the layered material platelets nor to the onium ions.

"Intercalation" shall mean a process for forming an Intercalate.

"Organic Onium Ions" shall mean a monomeric organic cation that includes a $N^+$, $P^+$, $O^+$ or $S^+$ cation which is capable of ion-exchanging with inorganic cations, such as $Li^+$, $Na^+$, $K^+$, $Ca^{+2}$, and $Mg^{+2}$ in the interlayer space between Layered Material Platelets. The onium ions are sorbed between Platelets of the Layered Material and ion-exchanged at protonated $N^+$, $P^+$, $O^+$ or $S^+$ ions with at least the $Na^+$ cations on the platelet surfaces to form an Intercalate.

"Epoxy resin" shall mean an epoxy polymer, or a monomer or prepolymer (oligomer) that can react with one or more anhydride curing agents to yield network thermosetting epoxy polymers. The polymer, monomer or prepolymer (oligomer) shall have at least one three-membered cyclic ether group commonly referred to as an epoxy group, 1,2-epoxide or oxirane.

"Co-intercalation" shall mean a process for forming an intercalate by intercalation of onium ions and an anhydride-curable epoxy resin and, optionally, an anhydride curing agent for the anhydride-curable epoxy resin.

"Concentrate" shall mean an intercalate comprising a layered silicate inorganic material including ion-exchanged and intercalated onium ions and an intercalated anhydride-curable epoxy resin, said intercalate combined with an anhydride-curable epoxy matrix polymer, in an intercalate concentration greater than needed to improve one or more properties of the matrix polymer, so that the concentrate can be mixed with additional matrix polymer to form a nanocomposite composition or a commercial article, and an anhydride curing agent added to the concentrate or to the nanocomposite composition.

"Intercalating Carrier" shall mean a carrier comprising water with or without an organic solvent used together with the onium ions and/or with the anhydride-curable epoxy resin to form an Intercalating Composition capable of achieving onium ion Intercalation of the Layered Material and, at the same time or separately, Intercalation of the co-intercalant anhydride-curable epoxy resin, and optionally an anhydride curing agent for the epoxy, between platelets of the Layered Material.

"Intercalating Composition" or "Intercalant Composition" shall mean a composition comprising onium ions and/or an Intercalant anhydride-curable epoxy resin, an Intercalating Carrier for the onium ions and/or for the anhydride-curable epoxy resin, a layered Material, and optionally an anhydride curing agent for the epoxy.

"Exfoliate" or "Exfoliated" shall mean individual platelets of an Intercalated Layered Material, or tactoids or clusters of individual platelets, e.g., 2–10 platelets, preferably 2–5 platelets, that are smaller in total thickness than the non-exfoliated Layered Material, capable of being dispersed as individual platelets and/or tactoids throughout an anhydride-cured epoxy resin.

"Exfoliation" shall mean a process for forming an Exfoliate from an Intercalate.

"Matrix Polymer" shall mean an anhydride-curable epoxy resin that the Intercalate and/or Exfoliate is dispersed throughout.

SUMMARY OF THE INVENTION

In brief, the present invention is directed to nanocomposite composition prepared by co-intercalation of onium ions and an anhydride-curable epoxy resin between the planar layers of a swellable layered silicate material, such as a phyllosilicate, preferably a smectite clay. The spacing of adjacent layers of the layered materials is expanded at least 3 Å, preferably at least about 5 Å, to at least about 10 Å, preferably to at least about 15 Å usually to about 15 Å to about 30 Å, e.g., 18 Å, by onium ion intercalation and ion-exchange with interlayer cations, such as $Li^+$, $Na^+$, $K^+$, $Ca^{+2}$, $Mg^{+2}$ or other inorganic cations that are naturally disposed in the interlayer space between adjacent platelets or layers of the swellable layered silicate materials. The ion-exchange binding between the onium ions and the platelet surface, via ion-exchange with intergallery inorganic cations, eliminates the presence of water molecules associated with the inorganic cations. Therefore, the onium ion-exchange enables the conversion of the hydrophilic interior clay surface to hydrophobic and, therefore, hydrophobic epoxy polymer molecules can then be intercalated into the clay galleries to increase the d-spacing of adjacent layers to at least about 20 Å, preferably about 25–35 Å.

Accordingly, one aspect of the present invention is to provide epoxy nanocomposite compositions, methods of manufacturing the nanocomposite compositions, epoxy-intercalated nanomers, and methods of manufacturing the nanomers for improving thermal, mechanical and/or gas-impermeability characteristics of anhydride-cured epoxy resins.

Another aspect of the present invention is to provide intercalates, and methods of manufacturing the intercalates, formed by intercalating an onium ion spacing/coupling agent that is not reactive with an anhydride-curable epoxy resin into a layered material, such as a smectite clay, and simultaneously or subsequently co-intercalating an anhydride-curable epoxy resin, said co-intercalated layered material capable of substantially increasing the thermal, mechanical, and/or gas-impermeability characteristics of an anhydride-curable rigid epoxy resin when added thereto in an amount of about 0.05% to about 60% by weight.

The above and other aspects and advantages of the present invention will become more apparent from the following detailed description of the preferred embodiments, read in conjunction with the drawings.

DETAILED DESCRIPTION OF THE PREFERRED EMBODIMENTS

Figure 1:
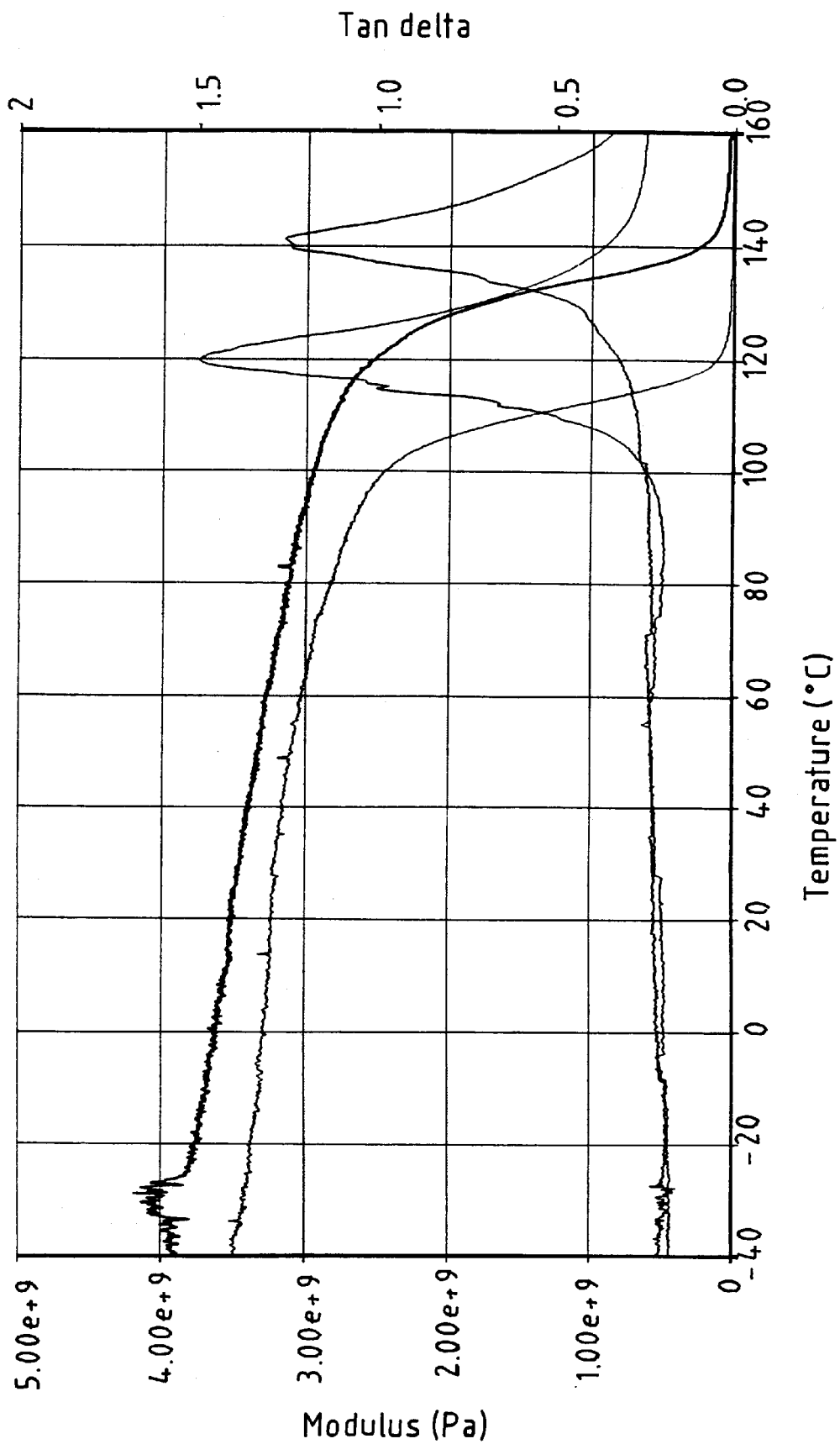
FIG. 1 is a graph showing the thermal analysis of a DER331 epoxy resin, ECA100 anhydride curing agent with and without a curing accelerator compound (AP-6E) with and without 10 parts of clay intercalate (per hundred parts (phr) of epoxy)—intercalated with the same epoxy resin and the same anhydride curing agent, added to the same anhydride-cured epoxy matrix polymer, showing a substantial increase in modulus with the intercalate.

Suitable onium ion molecules are not epoxy reactive and can be protonated primary amines ($^+NRH_3$), protonated secondary amines ($^+NR_2H_2$), protonated tertiary amines ($^+NR_3H$), or quaternary ammonium ions ($^+NR_4$). The onium ions have the general structure:

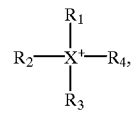

wherein X=N, P, O or S and $R_1$, $R_2$, $R_3$ and $R_4$, same or different, may be epoxy non-reactive organic radicals or hydrogen. It is preferred that at least two of $R_1$, $R_2$, $R_3$, and $R_4$ are organic radicals and can be aliphatic, aralkyl or aromatic, linear or branched.

The present invention is directed to a method of preparing intercalated layered materials prepared by co-intercalation of onium ions and anhydride-curable epoxy resins between the planar layers of a swellable layered material, such as a phyllosilicate, preferably a smectite clay. With the assistance of the intercalating carrier, the onium ions and the anhydride-curable epoxy polymer molecules will co-intercalate into the galleries of the layered materials to form intercalates or intercalate concentrate compositions capable of easy exfoliation.

While the invention described herein is disclosed by way of the preferred embodiment via expanding the interlaminar spacing between adjacent platelets of a layered silicate material, e.g., a phyllosilicate, by first intercalating onium ions between the silicate platelets, prior to or simultaneously with intercalating an anhydride-curable epoxy resin intercalant, it should be understood that the anhydride-curable epoxy resin intercalant can be intercalated between and complexed to the internal platelet faces by other well known mechanisms, such as the dipole/dipole (direct intercalation of the anhydride-curable epoxy resin oligomer or polymer) method disclosed in this Assignee's U.S. Pat. Nos. 5,880,197 and 5,877,248, hereby incorporated by reference; and by the acidification technique, by substitution with hydrogen (ion-exchanging the interlayer cations with hydrogen by use of an acid or ion-exchange resin) as disclosed in the Deguchi U.S. Pat. No. 5,102,948, and in the Pinnaraia, et al. U.S. Pat. No. 5,853,886, hereby incorporated by reference.

The present invention also is directed to the exfoliate and nanocomposite compositions which are prepared from the intercalate or intercalate concentrate compositions. The exfoliate can be prepared by diluting the concentrate in more anhydride-curable epoxy polymer, or adding the epoxy polymer, e.g., polymerized epoxy resins, and then curing with one or more anhydride curing agents.

In general, suitable epoxy and phenoxy resins are aliphatic-, cycloaliphatic-, or aromatic-based epoxy resins, such as, for example, epoxy resins represented by structural formulae I and II:

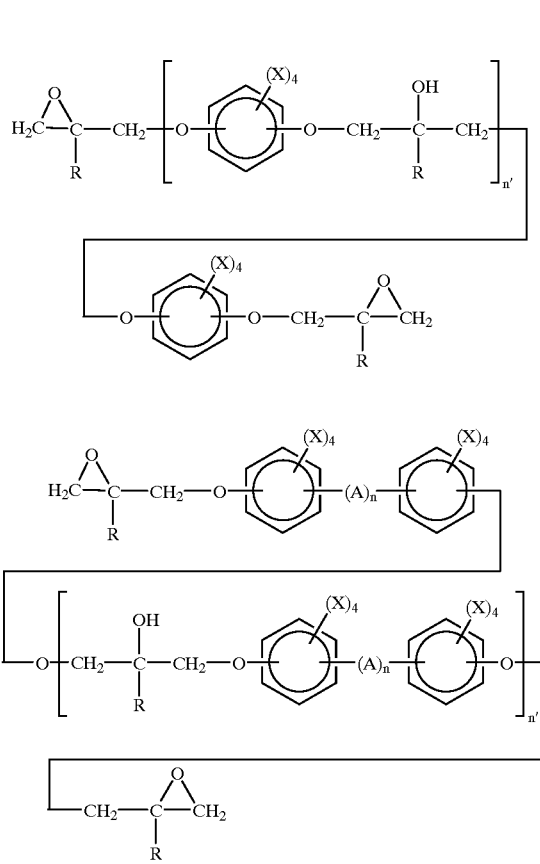

(I)

(II)

wherein each A is, independently, a divalent hydrocarbyl group having 1 to about 12, preferably 1 to about 6, and most preferably 1 to about 4, carbon atoms; each R is, independently, hydrogen or an alkyl group having 1 to about 3 carbon atoms; each X is, independently, hydrogen, a hydrocarbyl or hydrocarbyloxy group having 1 to about 12, preferably 1 to about 6, and most preferably 1 to about 4, carbon atoms, or a halogen atom, preferably chlorine or bromine; n is 0 or 1, and n' has an average value of about 2 to about 30, and preferably 10 to about 30.

In particular, the preferred epoxy and phenoxy resins are the (diglycidyl ether/bisphenol-A) resins, i.e., polyether diepoxides prepared by the polymeric adduction of bisphenol-A (III)

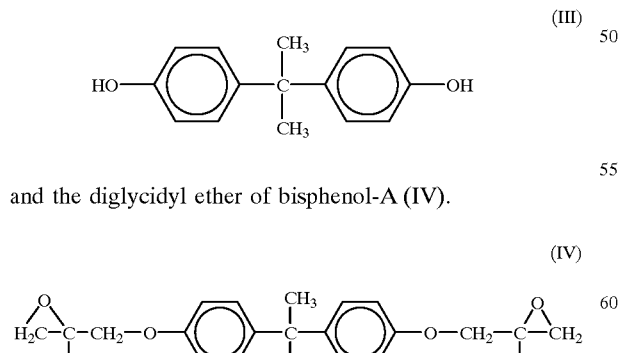

(III)

and the diglycidyl ether of bisphenol-A (IV).

(IV)

In this case, the epoxy resin is a mixture including polymeric species corresponding to different values of n' in the following idealized formula V:

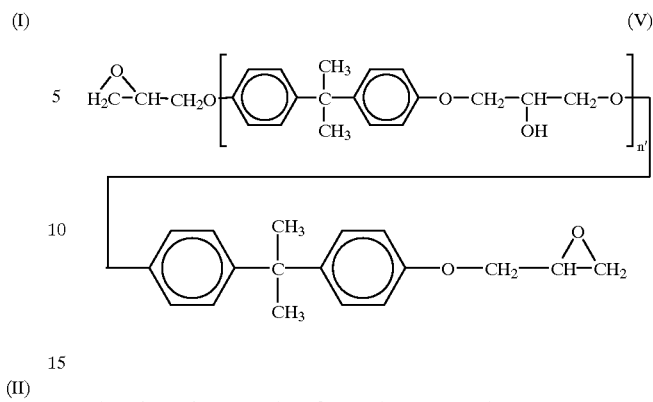

(V)

wherein n' is a number from about 2 to about 30.

In addition to bisphenol-A, useful epoxy and phenoxy resins can be prepared by advancing a diglycidyl ether of a bisphenol listed below with an exemplary, but nonlimiting, bisphenol listed below:

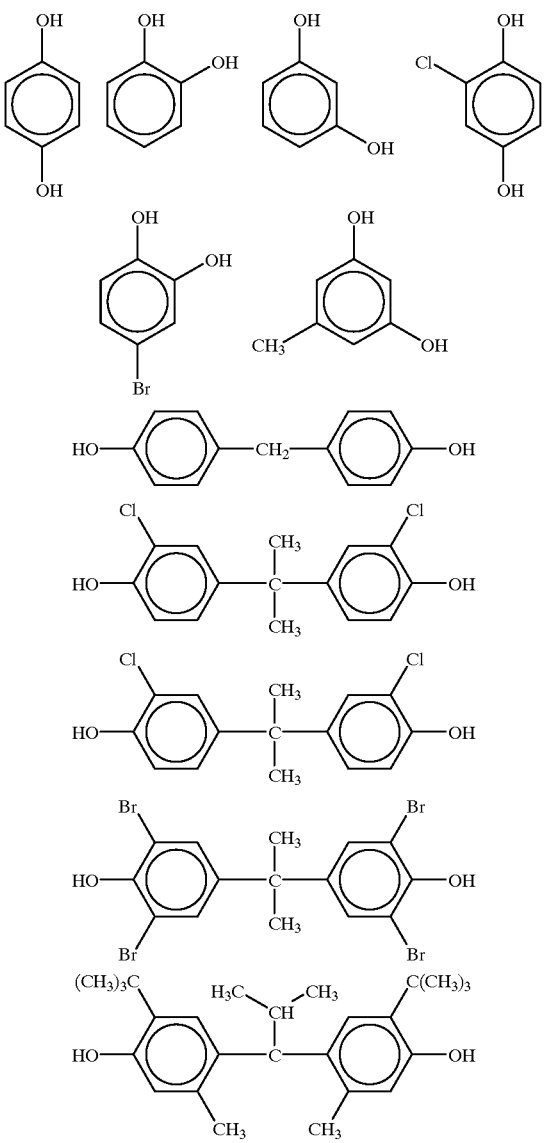

-continued

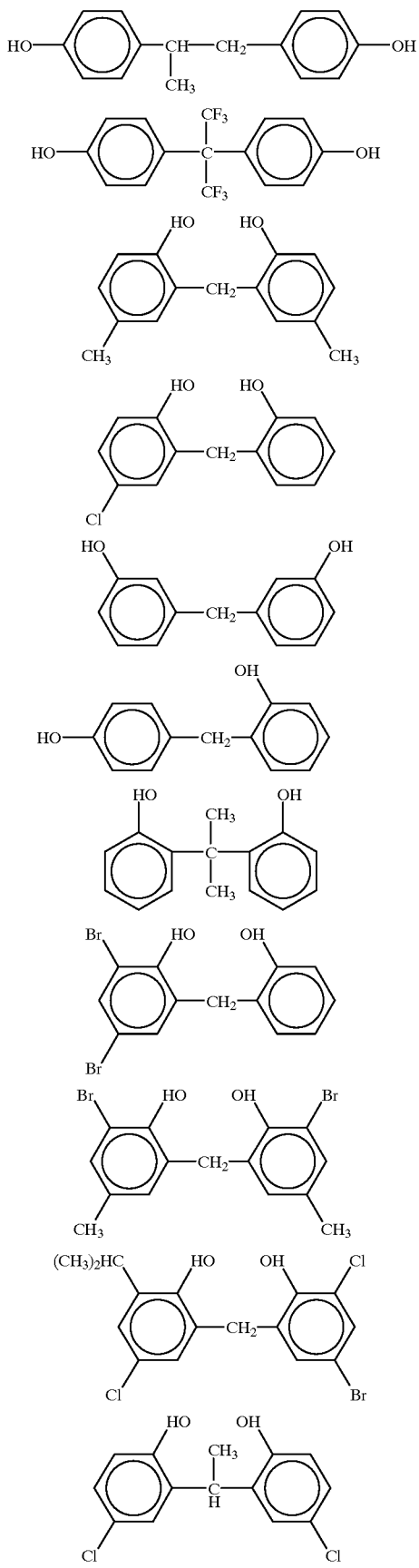

-continued

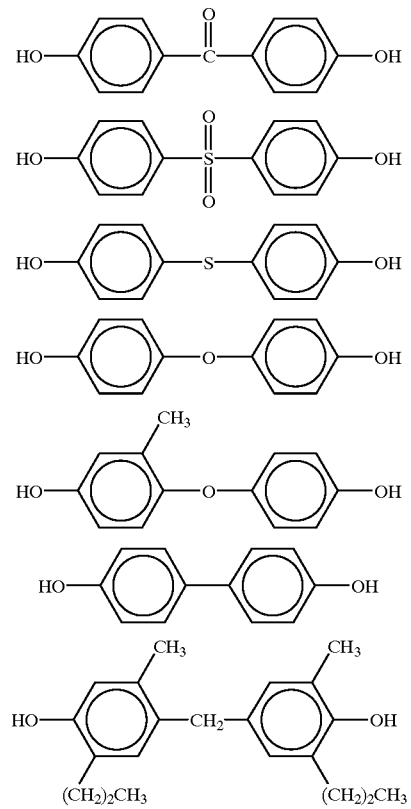

Other anhydride-curable epoxy resins that can be used as the co-intercalants of the present invention are prepared from the following starting epoxy-containing materials. These epoxy-containing materials are reacted with bisphenol-A or another bisphenol to adjust the molecular weight of the epoxy resin, as desired.

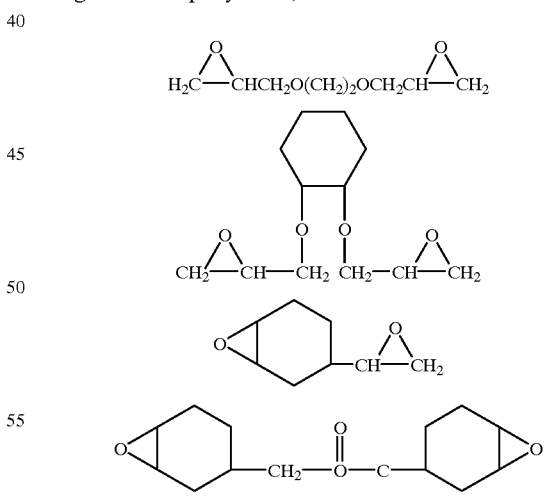

Other suitable epoxy resins useful in accordance with the present invention include epoxy novolac resins.

Epoxy novolac resins useful in making the nanocomposite composition of the present composition include polyfunctional epoxy resins having an epoxy functionality of about 2, and preferably greater than about 2, to about 6, and preferably greater than about 2 to about 5. The epoxy novolac resins include low molecular weight resins having an epoxide equivalent weight (EEW) of about 100 to about 220, and preferably an EEW of about 150 to about 210.

Epoxy novolac resins useful in the present invention include for example, but are not limited to, epoxy phenol novolac resins. Epoxy phenol novolac resins are represented by general structural formula (VI) wherein n is about 0.2 to about 4.

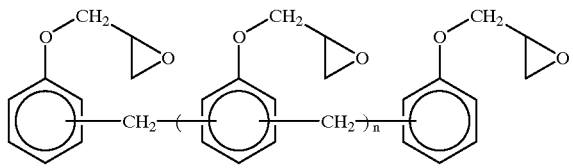

(VI)

The multifunctional epoxy phenol novolac resins contain a phenolic hydroxyl group per phenyl ring in random para-para', ortho-para', and ortho-ortho' combinations. Epoxidation with epichlorohydrin yields the highly functional epoxy phenol novolac resins. The epoxy phenol novolac resin can be a high viscosity liquid (i.e., n about 0.2) or a solid (i.e., n greater than 3).

Nonlimiting examples of epoxy phenol novolac resins useful in the present invention are ARALDE® EPN 1139 available from CIBA-GEIGY Corp., Hawthorne, N.Y., and D.E.N. 431, available from Dow Chemical Co., Midland, Mich. These epoxy phenol novolac resins have an n value (from structural formula I) of 0.2, an EEW of 175 and an epoxy functionality of 2.2. Other nonlimiting examples of epoxy phenol novolac resins are D.E.N. 438 and ARALDITE® EPN 1138, available from Dow Chemical Co. and CIBA-GEIGY Corp., respectively, and having an n value of 1.6, an EEW of 178 and an epoxy functionality of 3.6; and D.E.N. 439 available from Dow Chemical Co. and having an n value of 1.8, an EEW of 200 and an epoxy functionality of 3.8.

Another useful class of epoxy novolac resins is the epoxy cresol novolac resins depicted in general structural formula (VII), wherein n is about 1.7 to about 4.4.

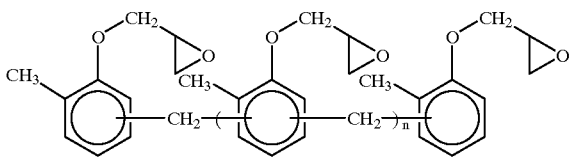

(VII)

The epoxy cresol novolac resins are prepared by glycidylation of o-cresol-formaldehyde condensates in the same manner as the epoxy phenol novolac resins. The epoxy functionality of the epoxy cresol novolac resins is about 2.7 to about 5.4.

Other useful epoxy novolac resins, i.e., polyfunctional epoxy resins, include but are not limited to a polynuclear phenol-glycidyl ether resin, such as the tetraglycidyl ether of tetrakis(4-hydroxyphenyl)ethane depicted in structural formula (VIII), and having an EEW of about 185 to about 210 and a theoretical epoxy functionality of four.

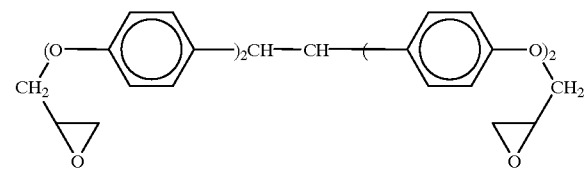

(VIII)

A tetraglycidylmethylenedianiline resin exemplified in structural formula (IX), as N,N,N',N'-tetraglycidyl-4,4'-diaminophenylmethane, having an EEW of about 117 to about 133 and an epoxy functionality of about 4 also can be used as the epoxy novolac resin.

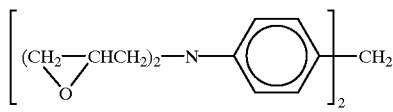

(IX)

In addition, triglycidyl p-aminophenol resins, available from CIBA-GEIGY Corp., and having an EEW of about 105 to about 114 and an epoxy functionality of about 3 can be used as the epoxy novolac resin.

Another exemplary epoxy novolac resin is a triglycidyl isocyanurate depicted in structural formula (X) and having an epoxy functionality of about 3 and an EEW of about 108.

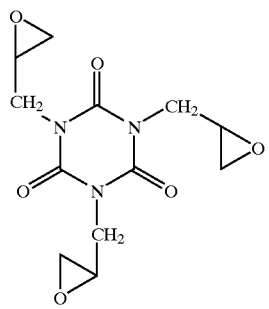

(X)

An epoxy novolac resin provides a sufficient number of cross-linking sites such that the resulting anhydride-cured epoxy nanocomposite composition is rigid and has an unexpectedly high Tg.

Any anhydride curing agent can be used to cure the above-described epoxy resins. Some of the available anhydride curing agents for epoxies, together with their suggested cure schedule, are listed in Table I:

TABLE I

| CURING AGENT | SUGGESTED CURE SCREDULE |
|---|---|
| Nadic methyl anhydride (NMA) | 2 hours at 90° C.[+] 4 hours at 165° C.[+] 16 hours at 200° C.[+] |
| Hexahydrophthalic anhydride (HHPA) | 2 hours at 100° C.[+] 2–6 hours at 150° C.[+] |
| Trimellitic anhydride (TMA) | 24 hours at 150–180° C.[+] |
| Dodecenyl succinic anhydride | 2 hours at 100° C.[+] |

TABLE I-continued

| CURING AGENT | SUGGESTED CURE SCREDULE |
|---|---|
| (DDSA) | 4–6 hours at 150° C.[+] |
| Phthalic anhydride | 24 hours at 120° C.[+] |
| (PA) | 8 hours at 150° C.[+] |
| Methyl hexahydrophthalic anhydride | 3 hours at 100° C.[+] |
| (MHHPA) | 6 hours at 140° C.[+] |
| Tetrahydrophthalic anhydride | 24 hours at 120° C.[+] |
| (THPA) | 8 hours at 150° C.[+] |
| Methyl tetrahydrophthalic anhydride | 2 hours at 90° C.[+] |
| (MTHPA) | 4 hours at 150° C.[+] |

Sorption of the onium ions should be sufficient to achieve expansion of the interlayer spacing of adjacent platelets of the layered material (when measured dry) to at least about 10 Å, preferably to at least about 15 Å, more preferably to at least about 20 Å, and after intercalation of the anhydride-curable epoxy resin, and optionally an anhydride curing agent for the epoxy, the interlayer spacing preferably is in the range of about 25–45 Å. To achieve intercalates that can be exfoliated easily, the molar ratio of onium ions to interlayer cations should be at least 0.5:1, preferably about 1:1 or more. The co-intercalation of the onium ions and anhydride-curable epoxy intercalants into the clay interlayer spacing can be achieved by intercalation of the anhydride-curable epoxy intercalant after intercalation of the onium ions; or by simultaneous intercalation of onium ions and anhydride-curable epoxy, and optionally an anhydride curing agent for the epoxy, at ambient or elevated temperatures.

Once exfoliated, the platelets of the intercalate are predominantly completely separated into individual platelets and the originally adjacent platelets no longer are retained in a parallel, spaced disposition, but are free to move as predominantly individual platelets throughout an anhydride-cured epoxy matrix polymer melt for enhancing one or more properties, particularly strength and glass transition temperature, of the matrix, anhydride-cured epoxy polymer. The predominantly individual phyllosilicate platelets, having their platelet surfaces ion-exchanged with the onium ion molecules, are randomly, homogeneously and uniformly dispersed, predominantly as individual platelets, throughout the anhydride-cured epoxy polymer to achieve new and unexpected strength and glass transition temperatures in a rigid epoxy nanocomposite composition.

Any swebable layered material that sufficiently sorbs the onium ion intercalant to increase the interlayer spacing between adjacent phyllosilicate platelets to at least about 10 Å (when the phyllosilicate is measured dry) may be used in the practice of this invention. Useful swellable layered materials include phyllositicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as rectorite, tarosovite, ledikite and admixtures of illites with the clay minerals named above.

Other layered materials having little or no charge on the layers may be useful in this invention provided they can be intercalated with the onium ion intercalant to expand their interlayer spacing to at least about 10 Å. Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" refers to the distance between the internal faces of the adjacent layers as they are assembled in the layered material before any delamination (exfoliation) takes place. The interlayer spacing is measured when the layered material is "air dry", e.g., contains about 3–6% by weight water, e.g., 5% by weight water based on the dry weight of the layered material. The preferred clay materials generally include interlayer cations such as $Na^+$, $Ca^{+2}$, $K^+$, $Mg^{+2}$, $NH_4^+$ and the like, including mixtures thereof.

Some intercalates require a shear rate that is greater than about 10 $sec^{-1}$ for such relatively thorough exfoliation. Other intercalates exfoliate naturally or by heating, or by applying low pressure, e.g., 0.5 to 60 atmospheres above ambient, with or without heating. The upper limit for the shear rate is not critical. In the particularly preferred embodiments of the invention, when shear is employed for exfoliation, the shear rate is from greater than about 10 $sec^{-1}$ to about 20,000 $sec^{-1}$, and in the more preferred embodiments of the invention the shear rate is from about 100 $sec^{-1}$ to about 10,000 $sec^{-1}$.

When shear is employed for exfoliation, any method which can be used to apply a shear to the intercalant/carrier composition can be used. The shearing action can be provided by any appropriate method, as for example by mechanical means, by thermal shock, by pressure alteration, or by ultrasonics, all known in the art. In particularly useful procedures, the composition is sheared by mechanical methods in which the intercalate, with or without the carrier or solvent, is sheared by use of mechanical means, such as stirrers, Banbury® type mixers, Brabender® type mixers, long continuous mixers, and extruders. Another procedure employs thermal shock in which shearing is achieved by alternatively raising or lowering the temperature of the composition causing thermal expansions and resulting in internal stresses which cause the shear. In still other procedures, shear is achieved by sudden pressure changes in pressure alteration methods; by ultrasonic techniques in which cavitation or resonant vibrations which cause portions of the composition to vibrate or to be excited at different phases and thus subjected to shear. These methods of shearing are merely representative of useful methods, and any method known in the art for shearing intercalates may be used.

Mechanical shearing methods may be employed such as by extrusion, injection molding machines, Banbury® type mixers, Brabender® type mixers and the like. Shearing also can be achieved by introducing the layered material and intercalant monomer at one end of an extruder (single or double screw) and receiving the sheared material at the other end of the extruder. The temperature of the layered material/intercalant monomer composition, the length of the extruder, residence time of the composition in the extruder and the design of the extruder (single screw, twin screw, number of flights per unit length, channel depth, flight clearance, mixing zone, etc.) are several variables which control the amount of shear to be applied for exfoliation.

To achieve the full advantage of the present invention, exfoliation should be sufficiently thorough to provide at least about 80% by weight, preferably at least about 85% by weight, more preferably at least about 90% by weight, and most preferably at least about 95% by weight delamination of the layers, and after exfoliation, some tactoids that include 2–10, particularly 2–5 platelets or, more preferably, individual platelet particles that can be substantially homogeneously dispersed in the anhydride-curable epoxy matrix polymer. As formed by this process, the platelet particles or platelet multilayer tactoids dispersed in the matrix anhydride-curable epoxy resin have the thickness of the individual layers, or small multiples less than about 10, preferably less than about 5 and more preferably less than about 3 of the layers, and still more preferably 1 or 2 layers. In the preferred embodiments of this invention, intercalation and delamination of every interlayer space is complete so that all or substantially all individual layers delaminate one from the other to form separate platelet particles for admixture with the carrier or solvent. The compositions can include the layered material as all intercalate, completely without exfoliation, and later, after compounding with the matrix polymer, such as by extrusion with a melt of the matrix polymer, exfoliation is achieved.

Epoxy molding compositions comprising an anhydride-cured epoxy polymer containing a desired loading of platelets and tactoids obtained from exfoliation of the intercalates manufactured according to the invention are outstandingly suitable for the production of sheets and panels having valuable properties. Such sheets and panels may be shaped by conventional processes such as vacuum processing or by hot pressing to form useful objects. The sheets and panels according to the invention are also suitable as coating materials for other materials comprising, for example, wood, glass, ceramic, metal or other plastics, and outstanding strengths can be achieved using conventional adhesion promoters, for example, those based on vinyl resins. The sheets and panels can also be laminated with other plastic films and this is preferably effected by co-extrusion, the sheets being bonded in the molten state. The surfaces of the sheets and panels, including those in the embossed form, can be improved or finished by conventional methods, for example by lacquering or by the application of protective films.

Matrix polymer/platelet composite materials are especially useful for fabrication of extruded films and film laminates, as for example, films for use in food packaging. Such films can be fabricated using conventional film extrusion techniques. The films are preferably from about 10 to about 100 microns, more preferably from about 20 to about 100 microns and most preferably from about 25 to about 75 microns in thickness.

The homogeneously distributed platelet particles, exfoliated in accordance with the present invention, and matrix anhydride-cured epoxy polymer that form the nanocomposites of one embodiment of the present invention are formed into a film by suitable film-forming methods. Typically, the composition is melted and forced through a film forming die. The film of the nanocomposite may go through steps to cause the platelets to be further oriented so the major planes through the platelets are substantially parallel to the major plane through the film. A method to do this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films may exhibit one or more of the following benefits: increased modulus; increased wet strength; increased dimensional stability; decreased moisture adsorption; decreased permeability to gases such as oxygen and liquids, such as water, alcohols and other solvents.

The onium ion-intercalated treated montmorillonite clays can be incorporated into the epoxy resin, or epoxy-anhydride mixture, and the onium ion-intercalated montmorillonite clay functions as an accelerator for the epoxy-anhydride curing reaction, without the need for a curing accelerator.

The onium ion-intercalated layered material, i.e., montmorillonite clay, can be added to the epoxy resin from room temperature up to about 120° C. The weight percentage or parts per hundred (phr) of intercalated clay added to the matrix polymer can be in the range of 1 to 50, with a preferred range of 5 to 35 phr, based on the total weight of the nanocomposite composition. The elevated temperature will reduce the viscosity of the epoxy resin and facilitate the dispersion of the onium ion-intercalated layered material, i.e., clay. The anhydride curing agent and optional accelerator can be added to the premixed epoxy-clay mixture in the form of the intercalate and/or to the intercalate/matrix polymer (nanocomposite) composition. The whole composition can be degassed and cured under normal curing cycles.

In the above-mentioned incorporation routes of the treated clays into the epoxy-anhydride composition, there is no need to add a curing accelerator to the epoxy resin-clay mixture. The resin will be cured without the addition of accelerator in the presence of the onium ion-intercalated layered material. The accelerator-free nanocomposites demonstrate comparable increased modulus and glass transition temperatures compared with the nanocomposites with accelerators.

The layered material, i.e., montmorillonite clay, is intercalated with non-functionalized onium ions, e.g., quaternary ammonium ions, such as octadecyl trimethyl ammonium (C183M), octadecyl dimethyl ammonium (C182M), octadecyl dimethyl benzyl ammonium (C182MB), octadecyl methyl bis-hydroxyethyl ammonium chloride (Q182, 50% solution), and/or di-tallow dimethyl ammonium (DTDM). The montmorillonite clays is intercalated and exchanged by ion-exchange reaction with the onium ion intercalant at molar ratios of the onium ion to the clay cation exchange capacity of preferably 0.5–1:1. The onium ion-intercalated montmorillonite clays preferably are then reduced by known particle size reduction methods, such as hammer mill, jet mill, or air-classifier mill. The onium ion-intercalated layered material can be mixed with the anhydride-curable epoxy resin first, then the anhydride curing agent and accelerator (if desired) can be added to the epoxy-clay mixture. Upon thorough mixing, the mixture can be cured under normal epoxy-anhydride curing conditions. The cured nanocomposites have demonstrated significant improvement in modulus before and after the glass transition temperature, and unexpected increased glass transition temperatures compared with the unfilled epoxy resin matrix polymers. Also, the nanocomposite demonstrated improved solvent and chemical resistance over a wide range of temperatures. X-ray diffraction was used to investigate the clay dispersion, intercalation and exfoliation in the cured nanocomposites.

Figure 2:
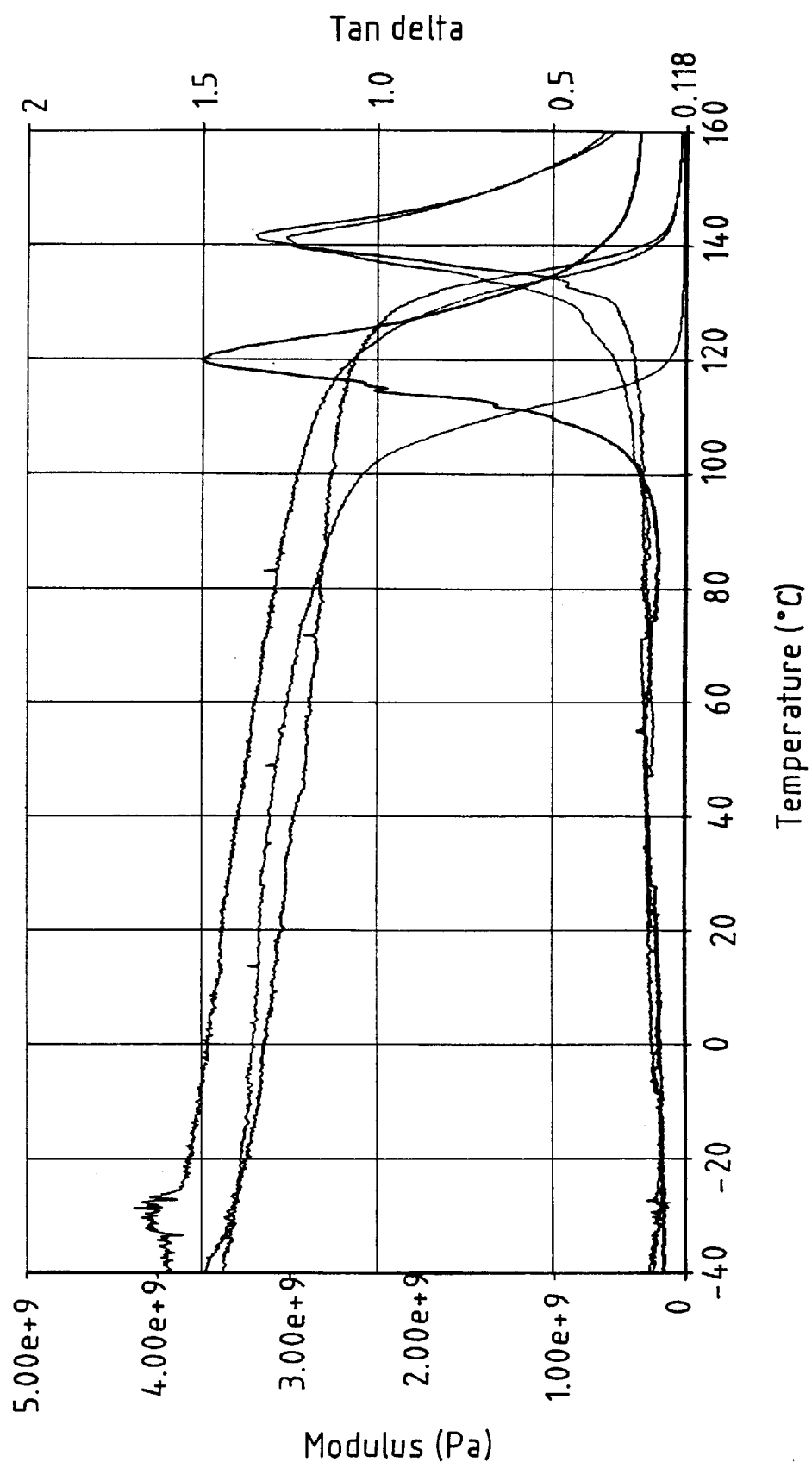
FIG. 2 is a graph showing the dynamic mechanical analysis (DMA) for DER331 epoxy resins with a ECA100 curing agent and a AP-6E curing accelerator with 20% by weight of an octadecyltrimethyl ammonium chloride-intercalated sodium montmorillonite clay, based on the weight of the epoxy.

The improved modulus, especially in the region near Tg, and elevated glass transition temperatures due to the nanocomposite formation are demonstrated in the DMA curves of FIGS. 1 and 2.

EXAMPLE 1

This example demonstrates the preparation of organic onium ion-intercalated clays, which can be used to make the anhydride-cured epoxy nanocomposites.

EXAMPLE 1A 100 grams of Na-montmorillonite clay (PGW) commercially available from Nanocor, Inc. (Arlington Heights, Ill.) was dispersed in 3 liters of de-ionized water by mechanical paddle mixer or colloidal mill. The clay dispersion was heated to about 75° C. to 80° C. 97.44 grams of octadecyl-trimethyl ammonium chloride (Q-ST-50, 50 wt % solution from Tomah Products), was added to the clay dispersion followed by vigorous mixing. The mixture was maintained at about 75° C. to 80° C. for about 30 minutes, followed by a de-watering process, such as filtration. The filter cake was re-dispersed into 4 liters of water at about 75° C. to 80° C. and the solid was collected and placed into a 75° C. to 80° C. oven to dry followed by particle size reduction. The filter cake also can be freeze-dried. The dried material had a d001 spacing of 24 Å as measured by X-ray diffraction and was coded as OD3M-PGW.

EXAMPLE 1B 100 grams of Na-montmorillonite clay (PGW) commercially available from Nanocor, Inc. (Arlington Heights, Ill.) was dispersed in 3 liters of de-ionized water by mechanical paddle mixer or colloidal mill. The clay dispersion was heated to about 75° C. to 80° C. A solution of 67.2 g of Q182 in 1 liter of de-ionized water was introduced to the clay dispersion followed by vigorous mixing. The mixture was maintained at 75° C. to 80° C. for about 30 minutes, followed by a de-watering process, such as filtration. The filter cake was re-dispersed into 4 liters of 75° C. to 80° C. water and the solid was collected and placed into a 75° C. to 80° C. oven to dry followed by particle size reduction. The filter cake also can be freeze-dried. The dried material had a d001 spacing of 19 Å as measured by X-ray diffraction and was coded as T50-PGW.

EXAMPLE 2

This example illustrates the intercalation of epoxy resins, and anhydride curing agents into the onium ion-intercalated clay galleries.

5 grams of each of the onium ion-intercalated clays (OD3M-PGW, T50-PGW) were mixed separately with 45 grams of epoxy resin, DER331 at 75° C. The clay-epoxy dispersions were very stable at both 75° C. and room temperature. 5 grams of the onium ion-intercalated clays was mixed with 45 grams of the anhydride curing agents, nadic methyl anhydride (NMA), hexahydrophalic anhydride (ECA-100) and (NMA) at room temperature. The clay-anhydride dispersions were stable after mixing, and had slight settle-down at extended storage time. However, the settle-down could be mixed well by gentle mixing before use. The resin-clay mixtures were each placed on a microscopic glass slide to measure X-ray diffraction patterns. The d001 spacing of each the intercalated clays in the resins are listed in Table 1.

Comparative Example 1

5 grams of the non-onium ion-intercalated (PGW) clay was mixed with 45 grams of epoxy resin, DER331 at 75° C. The clay-epoxy dispersion was very stable at both 75° C. and room temperature. 5 grams of the onium ion-intercalated clays of Example 1 (ODA- and Q 182-intercalated) were mixed with 45 grams of the anhydride curing agents, nadic methyl anhydride (NMA), hexahydrophalic anhydride (ECA-100) and (NMA) at room temperature. The clay-anhydride dispersions were stable after mixing, and had slight settle-down at extended storage time. However, the settle-down could be mixed well by gentle mixing before use. The resin-clay mixtures were placed on a microscopic glass slide to measure X-ray diffraction patterns. The d001 spacings of the intercalated clays in the resins are listed in Table 1.

TABLE 1 d001 results of the treated clays dispersed in DER331, ECA100, and NMA

| Example | Clays | $d_{001}$ (Å) Clay | $d_{001}$ (Å) in DER331 | $d_{001}$ (Å) in ECA100 | $d_{001}$ (Å) in NMA |
|---|---|---|---|---|---|
| 1 | OD3M-PGW | 24 | 37 | 34 | 36 |
| 1 | T50-PGW | 19 | 34 | 33 | 35 |
| Comparative 1 | PGW | 13 | 13 | 13 | 13 |
| Comparative 2 | ODA-PGW | 22 | 36 | 35 | 36 |
| Comparative 3 | Q182-PGW | 25 | 38 | 33 | 35 |

Comparative Example 2

100 grams of Na-montmorillonite clay (PGW) commercially available from Nanocor, Inc. (Arlington Heights, Ill.) was dispersed in 3 liters of de-ionized water by mechanical paddle mixer or colloidal mill. The clay dispersion was heated to about 75° C. to 80° C. 37.8 grams of octadecyl-amine, available from Akzo Nobel, was mixed with 70 ml, 2 N HCl in 1 liter 75° C. to 80° C. de-ionized water. The amine-HCl solution was introduced to the clay dispersion, followed by vigorous mixing. The mixture was maintained at 75° C. to 80° C. for about 30 minutes, followed by a de-watering process, such as filtration. The filter cake was re-dispersed into 4 liters of 75° C. to 80° C. water and the solid was collected and placed into a 75° C. to 80° C. oven to dry followed by particle size reduction. The filter cake also can be freeze-dried. The dried material has a d001 spacing of 22 Å as measured by X-ray diffraction and was coded as ODA-PGW.

5 grams of the ODA-PGW intercalated clay was mixed with 45 grams of epoxy resin, DER331 at 75° C. The clay-epoxy dispersions were very stable at both 75° C. and room temperature. 5 grams of the onium ion-intercalated clay was mixed with 45 grams of each of the anhydride curing agents, nadic methyl anhydride (NMA), hexahydrophalic anhydride (ECA-100) and (NMA) at room temperature. The clay-anhydride dispersions were stable after mixing, and had slight settle-down at extended storage time. However, the settle-down could be mixed well by gentle mixing before use. The resin-clay mixtures each were placed on a microscopic glass slide to measure X-ray diffraction patterns. The d001 spacings of the intercalated clays in the resins are listed in Table 1.

Comparative Example 3

100 grams of Na-montmorillonite clay (PGW) commercially available from Nanocor, Inc. (Arlington Heights, Ill.) was dispersed in 3 liters of de-ionized water by mechanical paddle mixer of colloidal mill. The clay dispersion was heated to about 75° C. to 80° C. 114.2 grams of octadecyl methyl bis-hydroxylethyl ammonium chloride (Q182, 50% solution), available from Tomah Products, was mixed with 1 liter of 75° C. to 80° C. de-ionized water. The Q182 solution was introduced to the clay dispersion followed by vigorous mixing. The mixture was maintained at about 75°

C. to 80° C. for about 30 minutes, followed by a de-watering process, such as filtration. The filter cake was re-dispersed into 4 liters of 75° C. to 80° C. water and the solids were collected and placed into a 75° C. to 80° C. oven to dry followed by particle size reduction. The filter cake also can be freeze-dried. The dried material has a d001 spacing of 25 Å as measured by X-ray diffraction and was coded as Q182-PGW.

5 grams of the Q182-PGW clay was mixed with 45 grams of epoxy resin, DER331 at 75° C. The clay-epoxy dispersions were very stable at both 75° C. and room temperature. 5 grams of the onium ion-intercalated clays were mixed with 45 grams of each of the anhydride curing agents, nadic methyl anhydride (NMA), hexahydrophalic anhydride (ECA-100) and (NMA) at room temperature. The clay-anhydride dispersions were stable after mixing, and had slight settle-down at extended storage time. However, the settle-down could be mixed well by gentle mixing before use. The resin-clay mixtures each were placed on a microscopic glass slide to measure X-ray diffraction patterns. The d001 spacings of the intercalated clays in the resins are listed in Table 1.

EXAMPLES 3 and 4 and COMPARATIVE EXAMPLES 4–6

These examples demonstrate the formation of epoxy-anhydride-clay nanocomposites and their superior mechanical and thermal properties.

The preparation of unfilled cured resin matrix DER331

100 grams of DER331 epoxy resin was mixed with 84 grams of ECA100 at 75° C. 1.5 grams of curing accelerator AP-6E (Dixie Chemicals) (benzyl trimethyl ammonium chloride solution) was added to the mixture. The mixture was then degassed and poured into an aluminum mold, which was coated with a mold releasing agent. The mixture was cured at 100° C. for 1 hour, followed by an additional 4 hours at 160° C.

Preparation of DER331-ECA100-Clay nanocomposite with the onium ion-intercalated clays (OD3M-PGW. and T50-PGW) of Example 1

5 grams of OD3M-PGW (10 phr) was mixed with 50 grams of DER331 at 75° C. for several minutes. 42 grams of ECA100 curing agent was added to the DER331-clay mixture and mixed thoroughly. 0.75 grams of the accelerator AP-6E was added to the mixture. The mixture was degassed and poured into an aluminum mold, which was coated with a mold releasing agent. The mixture was cured at 110° C. for 1 hour, followed by additional 4 hours at 160° C. DER331-ECA100-clay nanocomposites with 10 phr T50-PGW (Example 5), 10 phr Q182-PGW (Comparative Example 4), 10 phr PGW (Comparative Example 5), and 10 phr ODA-PGW (Comparative Example 6) were prepared by the same method as the OD3M-PGW. Table 2 summarizes observations of the composite samples.

TABLE 2

Appearance of the composite samples in Examples 3 and 4 and Comparative Examples 4–6.

| Samples | Clay Treatment | Appearance |
|---|---|---|
| Neat DER331-ECA100 | N/A | Light brown, transparent. |
| Example 3 | OD3M-PGW | Light brown, semi-transparent, no visible particles at x200. |
| Example 4 | T50-PGW | Light brown, semi-transparent, no visible particles at x200. |
| Comparative Example 4 | Q182-PGW | Light brown, semi-transparent, no visible particles at x200. |
| Comparative Example 5 | PGW | Phase separated, visible clay particles settle on the bottom of the sample. |
| Comparative Example 6 | ODA | No integrity, powdery. |

Dynamic mechanical analysis (DMA) was used to evaluate the mechanical and thermal properties of the matrix and composite materials in these examples and comparative examples. The DMA experiments were carried out at 2° C./min. and 1 Hz. The DMA curves plot the storage modulus data at different temperatures. The glass transition temperature (Tg) was determined by the peak position of the Tan delta (the phase difference between the storage modulus and the lost modulus). FIG. 1 is the DMA curves of DER331-ECA100 matrix and nanocolilposite containing 10 phr OD3M-PGW. The storage modulus of the composite increases significantly in the testing temperature range. The Tg of nanocomposites increases to 140° C. from the 120° C. Tg of pure matrix polymer. Table 3 lists the storage modulus and Tg of the nanocomposites of these examples.

TABLE 3

Storage modulus and glass transition temperatures of the matrix and nanocomposites.

| Samples | Clay Treatment | Modulus −20° C., MPa | Modulus 60° C., MPa | Modulus 120° C., MPa | Tg (° C.) |
|---|---|---|---|---|---|
| Neat DER331-ECA100 | N/A | 3.2 | 3.0 | 0.02 | 120 |
| Example 3 | OD3M-PGW | 3.5 | 3.4 | 2.6 | 140 |
| Example 4 | T50-PGW | 3.5 | 3.4 | 2.7 | 140 |
| Comparative Example 4 | Q182-PGW | 3.2 | 3.0 | 1.6 | 130 |
| Comparative Example 5 | PGW | 3.3 | 2.5 | 0.8 | 110 |
| Comparative Example 6 | ODA | failed | failed | failed | failed |

The composites containing OD3M-PGW and T50-PGW have much better mechanical and thermal properties compared with the composites in the comparative examples. The glass transition temperatures of these composites were confirmed by using differential scanning colorometry (DSC) or dynamic mechanical analysis (DMA).

EXAMPLES 5 and 6

These examples illustrate the different processing methods to prepare the nanocomposites.

In Example 5, 50 grams of DER331 epoxy resin was mixed with 42 grams of ECA100 curing agent at room temperature. Then 5 grams of OD3M-PGW was mixed with the premixed resin and curing agent. 0.75 grams of AP-6E curing accelerator was added to the mixture prior to degassing. The mixture was cured at 110° C. for 1 hour, followed by an additional 4 hours at 160° C. DMA results of the nanocomposite of Example 5 are nearly identical to the DMA results from Example 3.

In Example 6, 5 grams of ODA-PGW was mixed with 42 grams of ECA100 curing agent at room temperature. Then, 50 grams of DER331 epoxy resin was introduced to the ECA100-clay mixture. After being thoroughly mixed, the mixture was added 0.75 grams of AP-6E. The mixture was cured at 110° C. for 1 hour, followed by an additional 4 hours at 160° C. DMA results of the nanocomposite of Example 5 is nearly identical to the DMA results from Examples 3 and 5.

EXAMPLES 7–9 and COMPARATIVE EXAMPLE 7

These examples illustrate the feature that intercalated clays of the present invention function as an accelerator for the anhydride-epoxy curing reaction.

In Comparative Example 7, a mixture of 50 grams of DER331 epoxy resin and 42 grams of ECA100 curing agent was evaluated at 110° C. for 1 hour, followed by an additional 4 hours at 160° C. No curing occurred during the heating time, except slight oxidation of the resin mixture.

Examples 7–9 demonstrate that the OD3M-PGW, and T50-PGW clays function as an accelerator in the DER331-ECA100 curing reaction. The resin-clay (DER331-ECA100-OD3M-PGW) mixtures were prepared according to Examples 3, 5 and 6, but without adding the AP-6E curing accelerator. The mixture was cured at the same conditions as with the accelerator at 110° C. for 1 hour, followed by an additional 4 hours at 160° C. All mixtures were cured very well. DMA test results indicate the composites in Examples 7–9 have comparable mechanical and thermal properties to those in Examples 3, 5 and 6. DMA curves of Example 3 and Example 7 are shown in FIG. 2.

EXAMPLES 10 and 11

These examples demonstrate the superior mechanical and thermal performance of the DER33 1 -NMA resin based anhydride-cured epoxy composites.

The nanocomposites were prepared by the above-mentioned methods. The nanocomposites with 10 phr OD3M-PGW (Example 10) and 10 phr T50-PGW (Example 11) have significantly improved storage modulus and increased glass transition temperature.

What is claimed is:

1. A nanocomposite composition comprising about 0.05 weight percent to about 60 weight percent of a layered silicate material intercalated with a quaternary onium ion spacing agent, having the structure

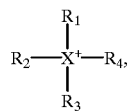

wherein X=N, P, O or S and $R_1$, $R_2$, $R_3$ and $R_4$, same or different, are epoxy non-reactive organic radicals, and about 40 weight percent to about 99.95 weight percent of a matrix polymer comprising an anhydride-curable epoxy resin that is not covalently bonded to the layered silicate material or to the onium ion spacing agent, wherein the intercalated layered silicate material is dispersed uniformly throughout the matrix polymer.

2. A nanocomposite composition in accordance with claim 1, wherein the matrix polymer is co-intercalated into the layered silicate material.

3. A nanocomposite composition in accordance with claim 2, wherein the matrix polymer is co-intercalated into the layered silicate material while dispersing the layered material throughout the matrix polymer.

4. A nanocomposite composition in accordance with claim 2, wherein the matrix polymer is co-intercalated into the layered silicate material prior to dispersing the layered silicate material throughout the matrix polymer.

5. A nanocomposite material in accordance with claim 1, wherein the onium ions include at least one moiety covalently bonded to a positively charged nitrogen atom that has a length of a least six carbon atoms.

6. A nanocomposite composition comprising a matrix polymer in an amount of about 40% to about 99.95% by weight, and about 0.05% to about 60% by weight of an intercalated phyllosilicate material formed by contacting a phyllosilicate with intercalant a quaternary onium ion spacing agent, having the structure

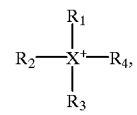

wherein X=N, P, O or S and $R_1$, $R_2$, $R_3$ and $R_4$, same or different, are epoxy non-reactive organic radicals, to form an intercalating composition, having a molar ratio of onium ions:phyllosilicate interlayer exchangeable cations of at least about 0.25:1 to achieve sorption of the onium ions between adjacent spaced layers of the phyllosilicate to expand the spacing between a predominance of the adjacent phyllosilicate platelets at least about 3 Å, when measured after sorption of the onium ions, and a second intercalant disposed between adjacent spaced layers of the phyllosilicate material to space the adjacent phyllosilicate an additional at least 3 Å, said second intercalant comprising an anhydride-curable epoxy resin that is not covalently bonded to the layered silicate material or to the onium ion spacing agent, wherein the intercalated layered silicate material is uniformly dispersed throughout the matrix polymer.

7. A composition in accordance with claim 6, wherein the intercalated phyllosilicate is exfoliated into a predominance of individual platelets.

8. A composition in accordance with claim 6, wherein the molar ratio of intercalant onium ions:phyllosilicate interlayer exchangeable cations is at least 30 mole percent, based on the number of moles of interlayer exchangeable cations in the phyllosilicate.

9. A composition in accordance with claim 8, wherein the molar ratio of intercalant onium ions:phyllosilicate interlayer exchangeable cations is at least 50 mole percent.

10. A nanocomposite concentrate composition comprising about 10% by weight to about 90% by weight of a layered silicate material intercalated with a quaternary onium ion spacing agent, having the structure

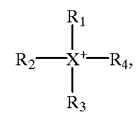

wherein X=N, P, O or S and $R_1$, $R_2$, $R_3$ and $R_4$, same or different, are epoxy non-reactive organic radicals, and intercalated with a polymer or oligomer of an anhydride-curable epoxy resin that is not covalently bonded to the layered silicate material, and about 10 weight percent to about 90 weight percent of a matrix polymer comprising an anhydride-curable epoxy resin, wherein the intercalated layered silicate material is dispersed uniformly throughout the matrix polymer.

11. A nanocomposite composition in accordance with claim 10, wherein the matrix polymer is intercalated into the layered silicate material.

12. A nanocomposite composition in accordance with claim 11, wherein the matrix polymer is intercalated into the layered silicate material while dispersing the layered material throughout the matrix polymer.

13. A nanocomposite composition in accordance with claim 11, wherein the matrix polymer is intercalated into the layered silicate material prior to dispersing the layered silicate material throughout the matrix polymer.

14. A nanocomposite composition in accordance with claim 10, wherein prior to intercalating the layered material with the anhydride-curable epoxy resin, the layered silicate material is first intercalated with said quaternary onium ion spacing agent.

15. A method of intercalating a phyllosilicate comprising:

contacting the phyllosilicate with an intercalating composition comprising at least a 0.25:1 molar ratio of quaternary onium ion cations, having the structure

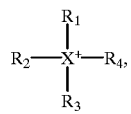

wherein X=N, P, O or S and $R_1$, $R_2$, $R_3$ and $R_4$, same or different, are epoxy non-reactive organic radicals, to phyllosilicate interlayer exchangeable cations, to achieve intercalation of, and ion-exchange of said onium ion cations with said interlayer cations, between said adjacent phyllosilicate platelets in an amount sufficient to space said adjacent phyllosilicate platelets at least about 3 Å; and co-intercalating the onium ion-intercalated layered silicate material with an anhydride-curable epoxy resin that is not covalently bonded to the layered silicate material or to the onium ion cations.

16. The method of claim 15, wherein said intercalating composition includes a water carrier comprising about 5% to about 50% by weight water, based on the dry weight of said phyllosilicate.

17. The method of claim 15, wherein the anhydride-curable epoxy resin is co-intercalated into the layered silicate material by co-intercalating an anhydride-curable epoxy resin, or its monomer reactants capable of polymerization to form an anhydride-curable epoxy resin.

18. The method of claim 17, wherein the epoxy resin intercalant is included in an intercalating composition in a concentration of about 10–100% by weight, based on the dry weight of the phyllosilicate.

19. A method of manufacturing a nanocomposite composition comprising a matrix polymer in an amount of about 40% to about 99.95% by weight of the composite material, and about 0.05% to about 60% by weight of an intercalated phyllosilicate material comprising (a) contacting a phyllosilicate with an intercalant quaternary onium ion spacing agent, having the structure

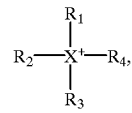

wherein X=N, P, O or S and $R_1$, $R_2$, $R_3$ and $R_4$, same or different, are epoxy non-reactive organic radicals, to form an intercalating composition, having a weight ratio of onium ions:phyllosilicate of at least about 0.5:1 to achieve sorption of the onium ions between adjacent spaced layers of the phyllosilicate to expand the spacing between a predominance of the adjacent phyllosilicate platelets at least about 3 Å; (b) co-intercalating into the layered silicate material a second intercalant selected from the group consisting of a polymerizable monomer, a polymerizable oligomer, a polymer, and a mixture thereof, said second intercalant being an anhydride-curable epoxy resin, or monomer reactants capable of polymerization to form an anhydride-curable epoxy resin, to further expand the spacing between a predominance of the adjacent phyllosilicate platelets at least an additional 3 Å; and (c) dispersing the co-intercalated layered silicate material throughout the matrix polymer.

20. A method of manufacturing a composite material containing about 0.05% to about 60% by weight of an intercalated phyllosilicate material, said phyllosilicate having intercalant quaternary onium ions, having the structure

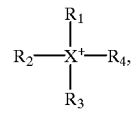

wherein X=N, P, O or S and $R_1$, $R_2$, $R_3$ and $R_4$, same or different, are epoxy non-reactive organic radicals, intercalated between and bonded, by ion-exchange, to an inner surface of the phyllosilicate platelets, and about 40% to about 99.95% by weight of a matrix polymer comprising an anhydride-curable epoxy resin that is not covalently bonded to the phyllosilicate material or to the onium ions, comprising:

contacting the phyllosilicate with said intercalant onium ions to achieve intercalation of said intercalant onium ions between said adjacent phyllosilicate platelets in an amount sufficient to space said adjacent phyllosilicate platelets a distance of at least about 3 Å; and dispersing the intercalate throughout said matrix polymer to achieve intercalation of a portion of the matrix polymer between the phyllosilicate platelets, in an amount sufficient to further space said adjacent phyllosilicate platelets an additional at least 3 Å.

21. A method in accordance with claim 20, wherein the matrix polymer is co-intercalated into the layered silicate material prior to dispersing the layered silicate material throughout the matrix polymer.

22. A method in accordance with claim 20, wherein the matrix polymer is co-intercalated into the layered silicate material while dispersing the layered material throughout the matrix polymer.

23. A method in accordance with claim 20, wherein the onium ions include at least one of $R_1$, $R_2$, $R_3$ and $R_4$, that has a length of at least six carbon atoms.

24. A method in accordance with claim 20, further including the step of adding an anhydride curing agent to said matrix polymer for intercalating a potion of the anhydride curing agent into the phyllosilicate together with the intercalation of the matrix polymer.

25. A method in accordance with claim 24, further including the step of adding a curing accelerator to the matrix polymer for intercalation of a portion of the curing accelerator into the phyllosilicate together with the matrix polymer.

26. A method in accordance with claim 20, further including the step of adding an anhydride curing agent to the matrix polymer prior to dispersing said onium ion-intercalated phyllosilicate throughout the matrix polymer.

27. A method in accordance with claim 20, further including the step of mixing the onium ion-intercalated phyllosilicate with the anhydride-curable epoxy resin and then adding the anhydride curing agent to the mixture.

28. A method in accordance with claim 27, further including the step of adding a curing accelerator to the mixture of the onium ion-intercalated phyllosilicate and the epoxy resin.

29. A method in accordance with claim 20, further including the step of adding an anhydride curing agent to the onium ion-intercalated phyllosilicate prior to dispersing the intercalate throughout the matrix polymer.

30. A method in accordance with claim 29, further including the step of adding a curing accelerator to the onium ion-intercalated phyllosilicate prior to dispersing the intercalate throughout the matrix polymer.

31. The method of claim 20, wherein said phyflosilicate is contacted with said intercalant onium ons, said phyllosilicate, and an anhydride-curable epoxy resin, wherein the concentration of the onium ions is in a molar ratio of onium ions:phyllosilicate interlayer exchangeable cations of at least 0.25:1.

32. The method of claim 31, wherein said phyllosilicate is contacted with said intercalant onium ions, said phyllosilicate, and an anhydride-curable epoxy resin, wherein the concentration of the onium ions is in a molar ratio of onium ions:phyllosilicate interlayer exchangeable cations of at least 0.5:1.

33. The method of claim 32, wherein said phyllosilicate is contacted with said intercalant onium ions, said phyllosilicate, and an anhydride-curable epoxy resin, wherein the concentration of the onium ions is in a molar ratio of onium ions:phyllosilicate interlayer exchangeable cations of at least 1:1.

34. A method of manufacturing a composite material containing about 40% to about 99.95% by weight of a matrix thermoplastic or thermosetting polymer, and about 0.05% to about 60% by weight of an intercalated phyllosilicate material, said intercalated phyllosilicate having an intercalant quaternary onium ion spacing/coupling agent, having the structure

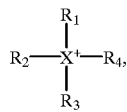

wherein X=N, P, O or S and $R_1$, $R_2$, $R_3$, and $R_4$, same or different, are epoxy non-reactive organic radicals, intercalated between adjacent phyllosilicate platelets comprising:

contacting the phyllosilicate with an intercalating composition including said intercalant onium ion spacing/coupling agent in a molar ratio of onium ions:phyllosilicate interlayer cations of at least 0.25:1 and an anhydride-curable epoxy resin that is not covalently bonded to the phyllosilicate or to the onium ion spacing/coupling agent, to achieve intercalation of said intercalant onium ion spacing/coupling agent and said anhydride-curable epoxy resin between said adjacent phyllosilicate platelets in an amount sufficient to space said adjacent phyllosilicate platelets at least an additional 3 Å;

combining the intercalated phyllosilicate with said thermoplastic or thermosetting polymer, and heating the thermoplastic polymer sufficiently to provide for flow of said thermoplastic polymer; and dispersing said intercalated phyllosilicate throughout said matrix polymer.

35. A method in accordance with claim 34, wherein the intercalating composition includes about 10% to about 200% by weight of said anhydride-curable epoxy resin intercalant, based on the dry weight of phyllosilicate contacted by said intercalating composition.

36. A method in accordance with claim 34, wherein the amount of onium ion spacing/coupling agent intercalated into the phyllosilicate material is in a molar ratio of at least 0.5:1, onium ions:exchangeable cations in the interlayer spaces of the phyllosilicate material.

37. A method in accordance with claim 36, wherein the amount of intercalant onium ion spacing/coupling agent intercalated into the phyllosilicate material is in a molar ratio of at least 1:1, onium ions:exchangeable cations in the interlayer spaces of the phyllosilicate material.

38. A method in accordance with claim 37, wherein the molar ratio of intercalated onium ion spacing/coupling agent to interlayer phyllosilicate cations is from about 1:1 to about 1:5.

39. A method in accordance with claim 34, wherein the weight ratio of the epoxy intercalant to phyllosilicate material, dry basis, is from about 20 grams of epoxy intercalant per 100 grams of phyllosilicate material to about 200 grams of epoxy intercalant per 100 grams of phyllosilicate material.

40. A method in accordance with claim 34, wherein the epoxy oligomer or polymer is intercalated into the phyllosilicate by melting the epoxy oligomer or polymer and dispersing the phyllosilicate throughout the epoxy melt.

41. A method in accordance with claim 40, wherein said dispersing is accomplished in an extruder.

42. A method of manufacturing a composite material containing about 40% to about 99.95% by weight of an oligomer or polymer of an anhydride-curable epoxy resin, and about 0.05% to about 60% by weight of an intercalated phyllosilicate material comprising intercalating the phyllosilicate material with a quaternary onium ion spacing agent, having the structure

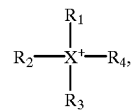

wherein X=N, P, O or S and $R_1$, $R_2$, $R_3$ and $R_4$, same or different, are epoxy non-reactive organic radicals, by contacting the phyllosilicate with onium ions in a molar ratio of onium ions:phyllosilicate interlayer exchangeable cations of at least 0.25:1;

forming a mixture of the intercalated phyllosilicate material with an anhydride-curable epoxy resin; and subjecting the mixture to conditions sufficient to react and polymerize the anhydride-curable epoxy resin with an anhydride curing agent for the epoxy resin to cure the epoxy resin while in contact with the intercalated phyllosilicate and to co-intercalate the epoxy resin between adjacent platelets of the phyllosilicate material, wherein the anhydride-curable epoxy resin is combined in amounts such that the resulting composite material contains 40% to 99.95% oligomer or polymer and 0.05% to 60% intercalated phyllosilicate.

43. A method of manufacturing a composite material containing about 10% to about 99.95% by weight of a matrix polymer selected from the group consisting of a thermoplastic polymer, a thermosetting polymer, and mixtures thereof, and about 0.05% to about 60% by weight of an intercalated phyllosilicate material, said intercalated phyllosilicate having an intercalant quaternary onium ion spacing/coupling agent, having the structure

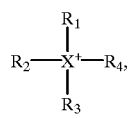

wherein X=N, P, O or S and $R_1$, $R_2$, $R_3$ and $R_4$, same or different, are epoxy non-reactive organic radicals, intercalated between and bonded, by ion-exchange, to an inner surface of the phyllosilicate platelets, comprising:

contacting the phyllosilicate with water and said intercalant onium ion spacing/coupling agent, to achieve intercalation of said intercalant onium ion spacing/coupling agent between said adjacent phyllosilicate platelets in an amount sufficient to space said adjacent phyllosilicate platelets a distance of at least about 3 Å;

contacting the phyllosilicate with a second intercalant selected from the group consisting of polymerizable monomers, a polymerizable oligomer, a polymer, and a mixture thereof, said second intercalant being an anhydride-curable epoxy resin, or monomer reactants capable of polymerization to form an anhydride-curable epoxy resin;

combining the intercalate with said matrix polymer; and dispersing said intercalate throughout said matrix polymer.

44. A composite material comprising a matrix polymer in an amount of about 40% to about 99.95% by weight of the composite material, and about 0.05% to about 60% by weight exfoliated platelets of a phyllosilicate material, said intercalate formed by contacting a phyllosilicate with an intercalating composition containing an intercalant quaternary onium ion spacing/coupling agent, having the structure

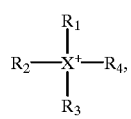

wherein X=N, P, O or S and $R_1$, $R_2$, $R_3$ and $R_4$, same or different, are epoxy non-reactive organic radicals, and a second intercalant selected from the group consisting of polymerizable monomers, a polymerizable oligomer, a polymer, and a mixture thereof, said second intercalant being an anhydride-curable epoxy resin, or monomer reactants capable of polymerization to form an anhydride-curable epoxy resin.

45. A method of manufacturing a composite material containing about 40% to about 99.95% by weight of a matrix thermoplastic or thermosetting polymer, and about 0.05% to about 60% by weight of exfoliated platelets of a phyllosilicate material, said platelets derived from an intercalated phyllosilicate having an intercalant quaternary onium ion spacing/coupling agent, having the structure

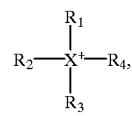

wherein X=N, P, O or S and $R_1$, $R_2$, $R_3$ and $R_4$, same or different, are epoxy non-reactive organic radicals, intercalated between adjacent phyllosilicate platelets comprising:

contacting the phyllosilicate with an intercalating composition including said intercalant quaternary onium ion spacing/coupling agent in a molar ratio of onium ions:phyllosilicate interlayer cations of at least about 0.25:1, and a second intercalant selected from the group consisting of polymerizable monomers, a polymerizable oligomer, a polymer, and a mixture thereof, said second intercalant being an anhydride-curable epoxy resin, or is monomer reactants capable of polymerization to form an anhydride-curable epoxy resin, wherein the concentration of second intercalant in said intercalating composition is at least about 5% by weight, based on the dry weight of the phyllosilicate, to achieve intercalation of said intercalant onium ion spacing/coupling agent and said second intercalant between said adjacent phyllosilicate platelets in an amount sufficient to space said adjacent phyllosilicate platelets a distance of at least about 3 Å;

combining the intercalated phyllosilicate with said thermoplastic or thermosetting polymer, and heating the thermoplastic polymer sufficiently to provide for flow of said thermoplastic polymer; and dispersing said intercalated phyllosilicate throughout said matrix polymer.

46. A method in accordance with claim 45, wherein the intercalating composition includes about 10% to about 200% by weight of said second intercalant, based on the dry weight of phyllosilicate contacted by said intercalating composition.

* * * * *